(12) United States Patent
Fisher

(10) Patent No.: US 10,098,362 B2
(45) Date of Patent: Oct. 16, 2018

(54) METHOD AND APPARATUS FOR COLD SMOKING MEAT OR SEAFOOD

(71) Applicant: Sea Delight Europe, SL, Las Palmas de Gran Canaria (ES)

(72) Inventor: Stephen Reiss Fisher, Quezon (PH)

(73) Assignee: Sea Delight Europe, SL, Las Palmas de Gran Canaria (ES)

( * ) Notice: Subject to any disclaimer, the term of this patent is extended or adjusted under 35 U.S.C. 154(b) by 0 days.

(21) Appl. No.: 14/423,910

(22) PCT Filed: Aug. 5, 2013

(86) PCT No.: PCT/IB2013/002903
§ 371 (c)(1),
(2) Date: Feb. 25, 2015

(87) PCT Pub. No.: WO2014/091300
PCT Pub. Date: Jun. 19, 2014

(65) Prior Publication Data
US 2015/0296816 A1    Oct. 22, 2015

(30) Foreign Application Priority Data
Dec. 13, 2012    (EP) ..................... 12196905

(51) Int. Cl.
*A01J 11/04*    (2006.01)
*A01J 13/00*    (2006.01)
(Continued)

(52) U.S. Cl.
CPC ............ *A23B 4/0523* (2013.01); *A23B 4/044* (2013.01); *A23B 4/0526* (2013.01);
(Continued)

(58) Field of Classification Search
CPC ....... A23B 4/044; A23B 4/052; A23B 4/0523; A23B 4/0526; A23L 13/40; A23L 13/428;
(Continued)

(56) References Cited

U.S. PATENT DOCUMENTS 3,615,729 A * 10/1971 Baker ................... A23L 27/27
                                                          426/314
3,806,609 A *  4/1974 Goblik .................. A23L 27/27
                                                          203/41
(Continued)

FOREIGN PATENT DOCUMENTS

WO        99/27794 A1    6/1999
WO    2012/036571 A1    3/2012

OTHER PUBLICATIONS

Cadwallader, "Wood Smoke Flavor," Handbook of Meat, Poultry and Seafood Quality, 2007, pp. 201-210.
(Continued)

*Primary Examiner* — Tu B Hoang
*Assistant Examiner* — Joseph Baillargeon
(74) *Attorney, Agent, or Firm* — Dilworth & Barrese, LLP

(57) ABSTRACT

An apparatus is provided for curing and more specifically for cold smoking meat or seafood with a blend of filtered smoke from an organic smoking material such as softwoods such as pine or tropical palms such as coconut wood or such as mixed wood sawdust from a sawmill, that are not traditionally used for smoking seafood or meat due to the harsh flavor imparted by their smoke, and unfiltered smoke from a second organic smoking material such as hardwood smoke, or other pleasant flavor-imparting smoke. The blending of filtered smoke from a first organic smoking material such as coniferous softwood, tropical palm wood or mixed sawdust from a sawmill with unfiltered pleasant flavor-imparting smoke from the second organic smoking material
(Continued)

reduces the cost of the smoking and curing process and allows versatility in application in terms of preservative properties and flavor imparted to the cured meat or seafood.

12 Claims, 8 Drawing Sheets

(51) Int. Cl.
*A01J 15/14* (2006.01)
*A23B 4/052* (2006.01)
*A23B 4/044* (2006.01)
*A23L 27/27* (2016.01)
*A23L 13/40* (2016.01)
*A23L 13/70* (2016.01)
*A23L 17/00* (2016.01)

(52) U.S. Cl.
CPC ............. *A23L 13/428* (2016.08); *A23L 13/72* (2016.08); *A23L 17/00* (2016.08); *A23L 27/27* (2016.08)

(58) Field of Classification Search
CPC .......... A23L 13/70; A23L 13/72; A23L 27/27; A23L 13/65; A22C 13/0013; A24B 15/32; A24B 15/16; A24B 15/301; A24D 3/14; A24D 3/10; A24F 1/30
USPC ........... 99/467, 482, 470, 468; 426/281, 315
See application file for complete search history.

(56) References Cited

U.S. PATENT DOCUMENTS

| 3,858,587 | A | * | 1/1975 | Cavelli | ................. A24D 1/004 131/336 |
| 3,873,741 | A | | 3/1975 | Melcer | |
| 5,484,001 | A | * | 1/1996 | Gray | ...................... A23L 13/67 141/114 |
| 5,840,362 | A | | 11/1998 | Underwood et al. | |
| 5,910,330 | A | * | 6/1999 | Fessmann | ............ A23B 4/0526 426/314 |
| 2006/0117964 | A1 | * | 6/2006 | Cauchois | ............... A23B 4/044 99/482 |
| 2010/0089248 | A1 | * | 4/2010 | Jones | ................. A47J 37/0641 99/444 |
| 2011/0151071 | A1 | * | 6/2011 | Ablett | .................... A23B 4/052 426/129 |

OTHER PUBLICATIONS

Stolyhwo et al, "Polycyclic aromatic hydrocarbons in smoked fish—a critical review," Food Chemistry, vol. 91, No. 2, Jun. 1, 2005, pp. 303-311.

Stumpe-Viksna et al., "Polycyclic aromatic hydrocarbons in meat smoked with different types of wood," Food Chemistry, vol. 110, No. 3, Oct. 1, 2008, pp. 794-797.

* cited by examiner

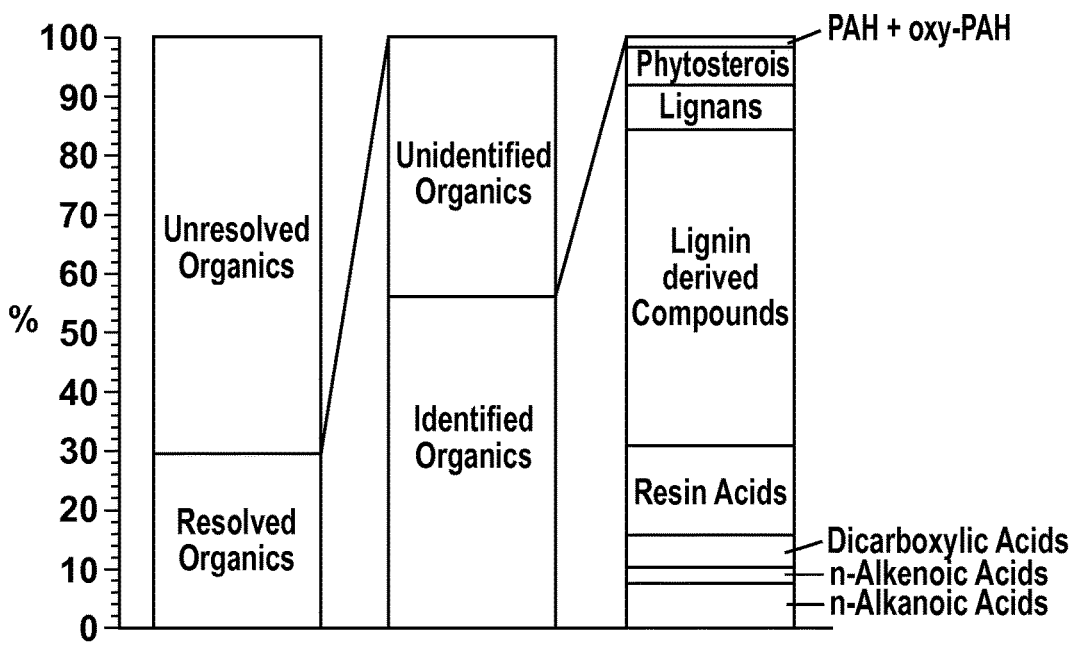
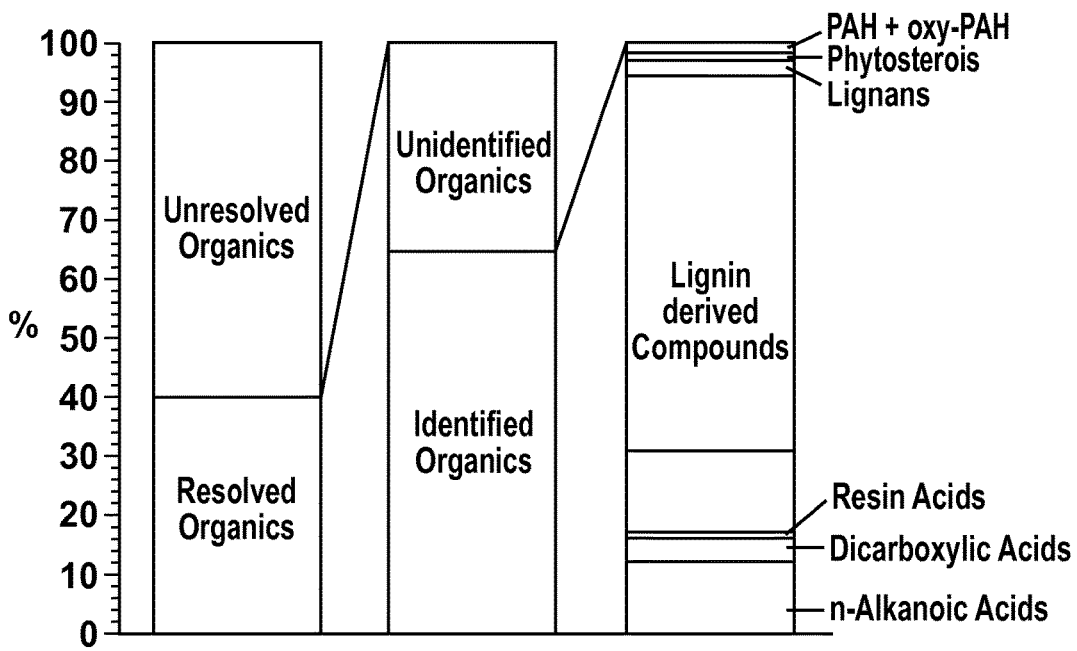
FIG. 4

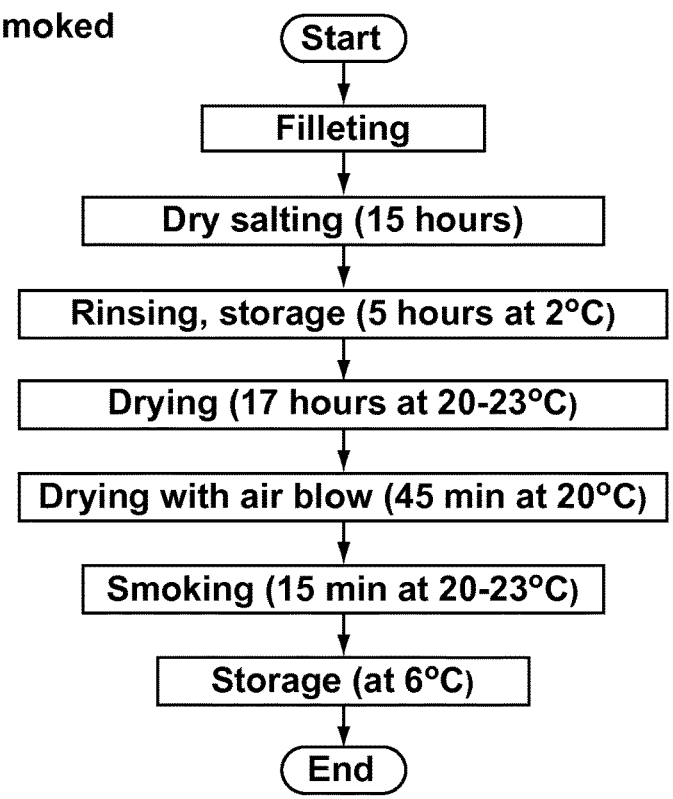
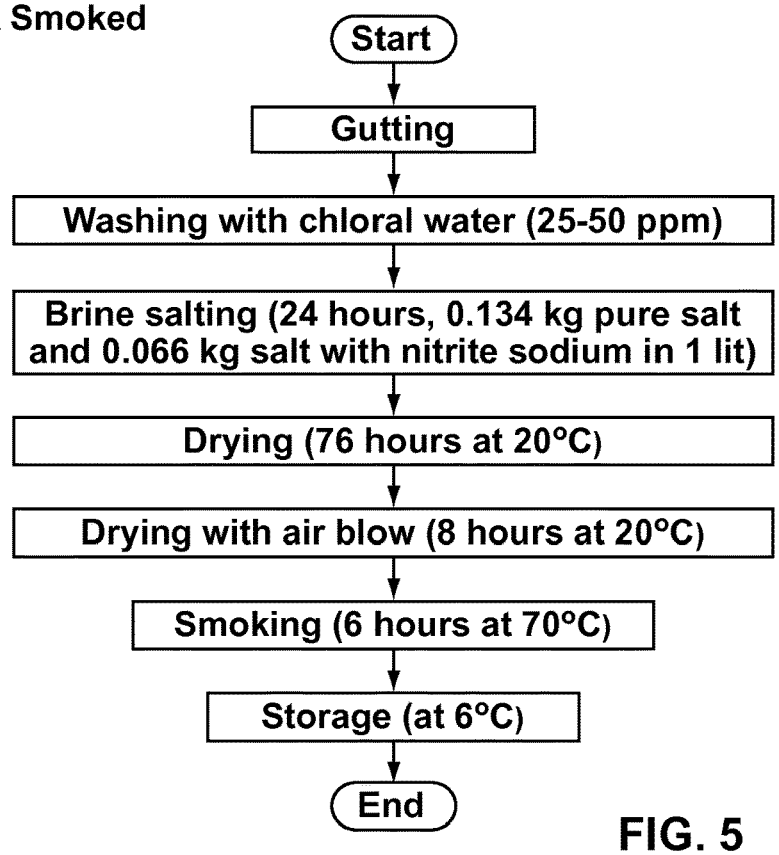
FIG. 5

CFU/g of total count for cold and hot smoked product (trout fillet)

| Step of Sampling | Cold smoked product | Hot smoked product with packing | Hot smoked product without packing |
|---|---|---|---|
| Raw fish | 200 | 0 | 0 |
| After process | 25525 | 0 | 0 |
| 1 week after process | $7.81*10^6$ | 0 | 10 |
| 2 week after process | $5.16*10^7$ | 50 | 300 |

FIG. 6

Time/Temperature Guidance for Controlling Pathogen Growth and Toxin Formation in Seafoods

| Potentially Hazardous Condition | Product Temperature | Maximum Cumulative Exposure Time |
|---|---|---|
| Growth and toxin formation by *Bacillus cereus* | 39.2-43°F (4-6°C)<br>44-50°F (7-10°C)<br>51-70°F (11-21°C)<br>Above 70°F (above 21°C) | 5 days<br>17 hours*<br>6 hours*<br>3 hours |
| Growth of *Campylobacter jejuni* | 86-93°F (30-34°C)<br>Above 93°F (above 34°C) | 48 hours<br>12 hours |
| Germination, growth, and toxin formation by *Clostridium botulinum* type A, and proteolytic B and F | 50-70°F (10-21°C)<br>Above 70°F (above 21°C) | 11 hours<br>2 hours |
| Germination, growth, and toxin formation by *Clostridium botulinum* type E, and nonproteolytic B and F | 37.9-41°F (3.3-5°C)<br>42-50°F (6-10 °C)<br>51-70°F (11-21°C)<br>Above 70°F (above 21°C) | 7 days<br>>2 days<br>11 hours<br>6 hours |
| Growth of *Clostridium perfringens* | 50-54°F (10-12°C)<br>55-57°F (13-14 °C)<br>58-70°F (15-21°C)<br>Above 70°F (above 21°C) | 21 days<br>1 day<br>6 hours*<br>2 hours* |
| Growth of pathogenic strains of *Escherichia coli* | 44.6-50°F (7-10°C)<br>51-70°F (11-21°C)<br>Above 70°F (above 21°C) | 14 days<br>6 hours<br>3 hours |
| Growth of *Listeria monocytogens* | 31.3-41°F (-0.4-5°C)<br>42-50°F (6-10°C)<br>51-70°F (11-21°C)<br>Above 70°F (above 21°C) | 7 days<br>2 days<br>12 hours*<br>3 hours* |
| Growth of *Salmonella* species | 41.4-50°F (5.2-10°C)<br>51-70°F (11-21°C)<br>Above 70°F (above 21°C) | 14 days<br>6 hours<br>3 hours |
| Growth of *Shigella* species | 43-50°F (6.1-10°C)<br>51-70°F (11-21°C)<br>Above 70°F (above 21°C) | 14 days*<br>12 hours*<br>3 hours* |
| Growth and toxin formation by *Staphylococcus aureus* | 44.6-50°F (7-10°C)<br>51-70°F (11-21°C)<br>Above 70°F (above 21°C) | 14 days<br>12 hours*<br>3 hours |

Continued From FIG. 7A

| | | |
|---|---|---|
| Growth of *Vibrio cholerae* | 50°F (10°C)<br>51-70°F (11-21°C)<br>Above 70°F (above 21°C) | 21 days<br>6 hours*<br>2 hours* |
| Growth of *Vibrio parahaemolyticus* | 41-50°F (5-10°C)<br>51-70°F (11-21°C)<br>Above 70°F (above 21°C) | 21 days<br>6 hours*<br>2 hours* |
| Growth of *Vibrio vulnificus* | 46.4-50°F (8-10°C)<br>51-70°F (11-21°C)<br>Above 70°F (above 21°C) | 21 days<br>6 hours<br>2 hours |
| Growth of *Yersinia enterocolitica* | 29.7-50°F (-1.3-10°C)<br>51-70°F (11-21°C)<br>Above 70°F (above 21°C) | 1 days<br>6 hours<br>2.5 hours |
| * Additional data needed. | | |

FIG. 7B

METHOD AND APPARATUS FOR COLD SMOKING MEAT OR SEAFOOD

FIELD OF THE INVENTION

The invention relates to methods and apparatuses for the curing and more specifically cold smoking of meat or seafood and more specifically to methods and apparatuses for the blending of filtered smoke with unfiltered smoke for cold smoking meat or seafood.

BACKGROUND

Typically, cold smoking techniques involve curing a meat or seafood with salt and/or sugar and applying hardwood smoke at ambient temperature generated from expensive hardwood. More modern cold smoking techniques involve some filtering of the hardwood smoke and temperature control of the smoking chamber. Some recently developed smoking techniques involve no direct application of actual wood smoke but rely on a curing and flavoring process using smoke extract or liquid smoke and result in a cured and smoke flavored but fresh-appearing product.

U.S. Pat. No. 2,116,223 teaches smoking foods using a system capable of producing desired temperatures and humidity conditions using a wet bulb thermostat to control smoke temperature and air flow and a suitable filter at the outlet of the smoke producer. One shortcoming associated to this method is it uses a large volume of hardwood to achieve the desired results.

U.S. Pat. No. 5,013,567 teaches a method of smoke generation for smoke-curing foods in which the smoke is generated using the top burning method and is not applied to the food to be smoked until a layer of charcoal covers the smoke generating material. The smoke is filtered through this layer of charcoal, described as a selective filter, to remove detrimental substances out of the smoke. One shortcoming associated with this method is that it relies on multiple re-fillable smoke generators.

U.S. Pat. No. 5,484,619 teaches the smoking of raw fish and meat to sterilize and prevent decomposition and discoloration without loss of freshness. The smoked fish and meat pick up agreeable taste and flavor, and remain as wholesome as fresh ones when kept at easily obtainable cold-storage or freezing temperatures, even during long transportation. The smoke generated by burning a smoking material at 250° to 400° C. is passed through a filter to remove tar. The smoke retaining ingredients, exerting highly preservative and sterilizing actions passed through the filter, are cooled to between 0° and 5° C. in a cooling unit. Fish or meat is processed by exposure to the smoke at the extra-low temperature thus obtained. The smoking material disclosed are the traditionally used woods such as oak, Japanese oak, beech, cherry and alder. One shortcoming associated to the use of these woods is that they are not readily available in many regions and if they are, they tend to be expensive to use in the smoking process.

U.S. Pat. No. 5,972,401 teaches a tasteless super-purified smoke manufactured to treat seafood and meat to preserve the freshness, color, texture, and natural flavor, particularly after the food is frozen and thawed. The smoke is generated by burning an organic smoking material at 260 to 571° C. in a smoke generator. It is then passed through a precipitation filtering tower comprised of filters of ice, cloth, and activated carbon to remove taste imparting, and carcinogenic particulates and vapors. The super-purified smoke is then stored and aged in a temporary pressure pot or in canisters for treatment at the same time or at another place and time. The super-purified smoke is used to treat seafood or meat in plastic bags at temperatures between its variable freezing point and 7.8° C. for twelve to forty-eight hours, or until the desired effect is achieved. The product is then frozen, stored for up to one year, and quick- or slow thawed with little degradation of the treated seafood or meat. The process disclosed preserves the seafood without imparting any detectable taste or odor. One shortcoming associated to this method is that there is no flavor imparted into the meat or seafood as any flavor is filtered from the smoke to ensure that no flavor or detectable taste or odor is imparted.

A need therefore exists for providing a method and/or apparatus for curing and/or cold smoking meat and/or seafood that imparts a pleasing taste while reducing the reliance on expensive hardwood for imparting taste.

SUMMARY OF INVENTION

An apparatus is provided for curing and more specifically for cold smoking meat or seafood with a blend of filtered smoke from an organic smoking material such as softwoods such as pine or tropical palms such as coconut wood or such as mixed wood sawdust from a sawmill, that are not traditionally used for smoking seafood or meat due to the harsh flavor imparted by their smoke, and unfiltered smoke from a second organic smoking material such as hardwood smoke, or other pleasant flavor-imparting smoke. The blending of filtered smoke from a first organic smoking material such as coniferous softwood, tropical palm wood or mixed sawdust from a sawmill with unfiltered pleasant flavor-imparting smoke from the second organic smoking material reduces the cost of the smoking and curing process and allows versatility in application in terms of preservative properties and flavor imparted to the cured meat or seafood.

In one non-limiting embodiment, there is provided a smoking apparatus for producing a blending smoke for smoking meat or seafood, the smoking apparatus comprising:

an inlet for receiving a first unfiltered smoke comprising a harsh flavor-imparting characteristic;

a filter in communication with the inlet for removing the harsh flavor-imparting characteristic from the first smoke thereby producing a filtered smoke;

a smoke collection chamber for receiving an organic smoking material, the smoke collection chamber in communication with a burner for smoking material placed in the smoke collection chamber to generate an unfiltered smoke;

a smoke mixing bladder in communication with both the filter and the smoke collection chamber for receiving the filtered smoke and the unfiltered smoke for blending the filtered smoke and the unfiltered smoke for providing a blended smoke for curing and cold smoking a meat or seafood.

In a further embodiment to that outlined above, the smoking apparatus further comprises a flow meter and a flow valve between the filter and the smoke mixing bladder for allowing variable control of the flow of filtered smoke into the smoke mixing bladder.

In a further embodiment to that outlined above, the smoking apparatus further comprises a flow meter and a flow valve between the smoke collection chamber and the smoke mixing bladder for allowing variable control of the flow of unfiltered smoke into the smoke mixing bladder.

In a further embodiment to that outlined above, the smoking apparatus further comprises a cold smoking chamber in communication with the smoke mixing bladder for receiving blended smoke therefrom and the smoke collection chamber for receiving unfiltered smoke therefrom, the cold smoking chamber suitable for holding meat or seafood for cold smoking thereof.

In a further embodiment to that outlined above, the smoking apparatus further comprises a flow meter and a flow valve between the smoke mixing bladder and the cold smoking chamber for allowing variable control of the flow of blended smoke into the cold smoking chamber.

In a further embodiment to that outlined above, the smoking apparatus further comprises a flow meter and a flow valve between the smoke collection chamber and the cold smoking chamber for allowing variable control of the flow of unfiltered smoke into the cold smoking chamber.

In a further non-limiting embodiment, there is provided a method of smoking a meat or seafood product using a blended smoke, the blended smoke comprising a filtered smoke and an unfiltered smoke, the method comprising;
  burning a first organic smoking material to generate a first smoke;
  filtering the first smoke to remove flavor from the first smoke to generate a filtered smoke;
  burning a second organic smoking material to generate an unfiltered smoke;
  blending the filtered smoke and the unfiltered smoke to generate a blended smoke;
  smoking a meat or seafood with the blended smoke.

In a further embodiment to that outlined above, the method further comprises:
  smoking a meat or seafood with the blended smoke and with the unfiltered smoke.

In a further embodiment to that outlined above, the method further comprises filtering the first smoke to remove ash and tar therefrom.

In a further embodiment to that outlined above, the blended smoke comprises a ratio of 1 to 49% v/v unfiltered smoke and 99 to 51% v/v filtered smoke.

In a further embodiment to that outlined above, the blended smoke comprises a ratio of 10% v/v unfiltered smoke and 90% v/v filtered smoke.

In a further embodiment to that outlined above, a ratio of 40% v/v blended smoke to 60% v/v unfiltered smoke is used to smoke the meat or seafood.

In a further embodiment to that outlined above, the first organic smoking material comprises material that generates a harsh flavored smoke.

In a further embodiment to that outlined above, the first organic smoking material comprises coniferous softwoods, for example pine, and/or tropical palms for example coconut wood.

In a further embodiment to that outlined above, the second organic smoking material comprises material that generates a pleasing flavored smoke.

In a further embodiment to that outlined above, the second organic smoking material comprises hickory, cherry, alder, oak, apple or other flavorful smoke from combusted organic material such as sugarcane bagasse, rice hull or coconut husk fiber.

In a further embodiment of this aspect, in the method outlined above the first organic smoking material is combusted at between 500°-700° C. This embodiment may be combined with other embodiments above.

In a further embodiment to that outlined above, the second organic smoking material is combusted at between 300°-400° C.

In a further embodiment to that outlined above, the step of smoking the meat or seafood is carried out substantially at 0° to 4° C. with short periods at higher temperatures of up to 30° C.

In another non-limiting embodiment, there is provided a process for producing a cured and smoke flavored meat or fish having a fresh appearance, the cured and smoke flavored meat or fish optionally further curable and cold smokable for producing a meat or fish having a fully cold smoked appearance, wherein the process comprises:
  i) injecting a liquid mixture of salt, sugar and water in any suitable ratio into the fish or meat; and
  ii) injecting blended smoke into the fish or meat;
    wherein steps i) and ii) are prior to any curing and smoking process in a disposable bag.

In a further embodiment to that outlined above, the levels of salt and sugar may be adjusted from a slight cure to a full cure and the level of smoke flavor adjusted from very slight to fully smoked flavor. This embodiment may be combined with the previous embodiment.

BRIEF DESCRIPTION OF THE DRAWINGS

FIG. 4 shows two tables comparing the levels of the compounds found in pine and oak wood smoke, wherein the tables illustrate the higher levels of the harsh flavor-imparting resin acids found in pine wood smoke compared to oak wood smoke;

FIG. 5 is a flow chart illustrating an example of processing steps and temperatures at each step for typical cold and hot smoking processes, whereby the temperatures exceed HACCP guidelines for controlling histamine development in scombroid fish species and pathogen development in meat or seafood;

FIG. 6 is a table showing the development of bacteria, expressed in CFU/g, in salmon in a typical cold smoking process with the fish exposed to temperatures of 20° C. to 23° C. for 18 hours in the course of the process; and FIGS. 7A and B are a table showing US FDA guidance on time/temperature exposure limits for controlling pathogen (bacteria) development in seafood.

DETAILED DESCRIPTION

Coniferous softwoods, for example pine, and tropical palms for example coconut wood, or mixtures of such woods and other woods as found in mixed wood sawdust from a sawmill, are traditionally not used for smoking seafood or meat due to the harsh flavor they impart from their smoke. However, depending on the region, these coniferous softwoods, tropical palm woods or mixed woods from a sawmill are more readily available than traditional woods that may impart a more pleasing flavor but which are less available and/or more expensive. In addition to the coniferous softwoods, tropical palms and mixed woods sawdust, there are other woods that impart a harsh flavor that, depending on the region, may be more readily available and/or cheaper than traditional woods or other organic smoking material used for smoking. For the purpose of this disclosure, it will be appreciated that traditional woods or other organic smoking materials include any organic materials that are typically used in the smoking process including woods or other organic material used individually or in combination, naturally or flavored. Non-limiting examples of traditional wood or organic smoking material used in smoking include hickory, cherry, alder, oak, apple or other flavorful smoke from combusted organic material such as sugarcane bagasse, rice hull or coconut husk fiber.

In one embodiment, a method for curing and/or cold smoking meat or seafood is provided that uses softwoods, tropical palm wood, mixed woods from a sawmill or other woods that are not traditionally used for smoking seafood or meat due to the harsh flavor imparted by their smoke. The untraditional smoke is filtered to reduce the harsh flavor components in the smoke to produce a reduced-flavor filtered smoke. The reduced-flavor filtered smoke is blended with unfiltered traditional and/or flavorful wood smoke, such as for example that from hickory, cherry, alder, oak, apple or other flavorful smoke from combusted organic material such as sugarcane bagasse, rice hull or coconut husk fiber. The resulting blended flavored smoke (BFS) has natural preservative properties as well as flavor-imparting properties and can be used to impart preservative properties and pleasing flavor to cured meats and seafood. The blended flavored smoke may also be inexpensive if the reduced-flavor filtered smoke is produced from organic material that is less expensive such as soft woods, tropical palm wood or mixed wood sawdust from a sawmill, depending on the region. In addition, the blended smoking method and the blending smoke may be easier to produce in large volumes and apply, even in tropical climates where traditional woods used for cold smoking are extremely rare or very expensive to import.

Illustrative non-limiting embodiments outlining exemplary modes of construction, application, and modes of operation of the blended smoke are described below.

Figure 1:
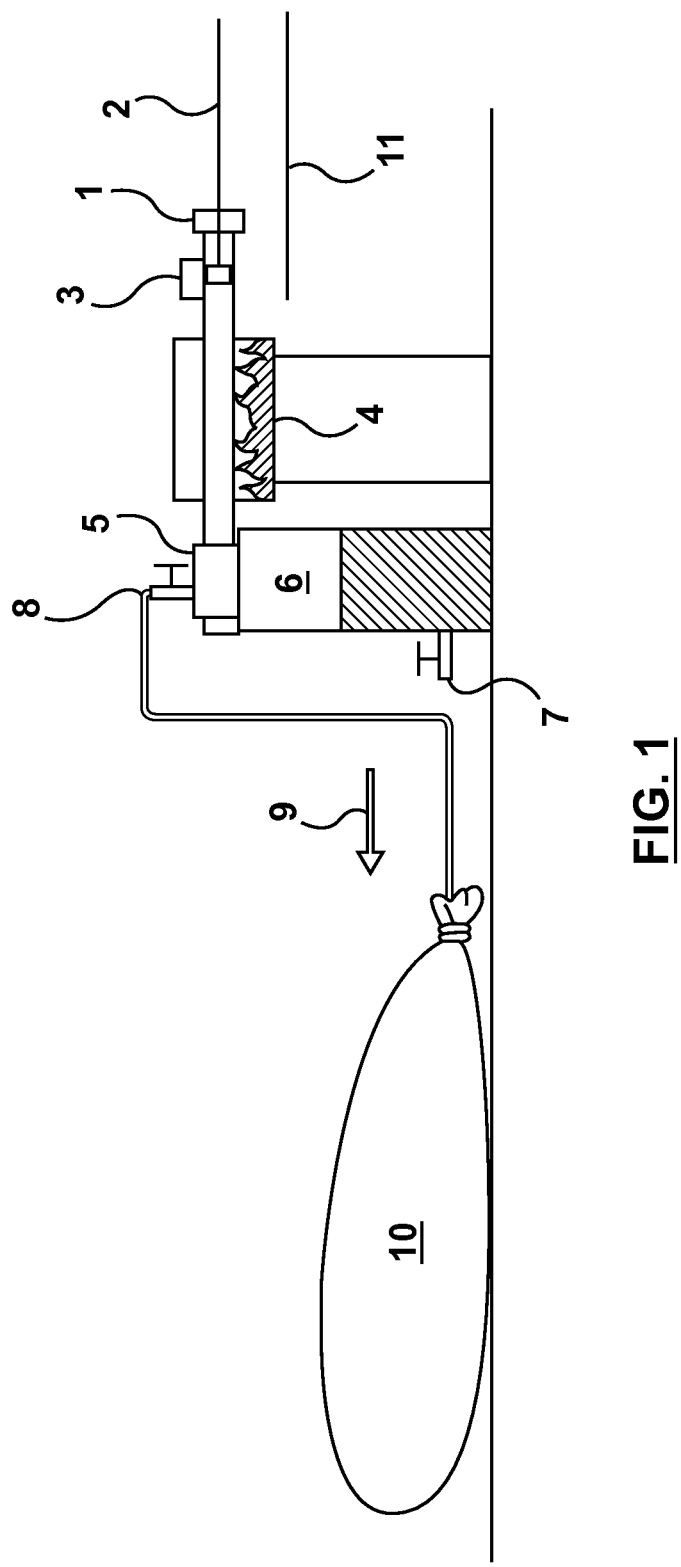
FIG. 1 is a schematic illustrative of one embodiment of an apparatus for burning and collecting smoke from softwoods, such as pine or tropical palms such as coconut wood or mixed sawdust from a sawmill, that are not traditionally used for smoking seafood due to the harsh flavor imparted by their smoke.

One embodiment of a smoke generating apparatus for burning a first smoke producing wood and collecting the smoke prior to filtering is shown in FIG. 1. It will be appreciated that the first smoke may be from an untraditional organic material that may, if unfiltered, impart a harsh or unfavorable flavor in the smoke. For example, the first smoke may be generated from coniferous softwoods, for example pine, and tropical palms, for example coconut wood or, for example, a mixture of woods form a sawmill.

The smoke generating apparatus includes a pipe burning tube 1. The pipe burning tube 1 may be steel in construction. In one example, the pipe burning tube 1 has a 4 inch interior diameter and is 38 inches long with a threaded cap at one end.

Inserted inside the burning tube is a ram plunger 2 comprised generally of a round cylinder. The ram plunger 2 may additionally include a handle. The ram plunger 2 passes through a hole in the cap on the burning tube 1 and is used to both push the harsh flavored wood sawdust to be burned down the length of the burning tube 1 and to restrict airflow to the burning tube 1 thereby assuring that the sawdust will combust in concentrated form and create smoke that is substantially undiluted by air. The ram plunger 2 may be of steel construction. In one embodiment the ram plunger 2 is 3.95 inches in diameter with a steel handle 54 inches in length. The means of moving sawdust down the tube may vary and may also be automated using an auger or other sawdust conveyance means.

In operation, the sawdust from the harsh flavor-imparting wood is placed into the burning tube through a hopper 3, optionally a rectangular shaped box with a curved bottom fitting over the burning tube 1. The hopper 3 is adapted to fit over a hole in the burning tube 1. In one non-limiting embodiment, the hopper 3 may be 5 inches long and 3 inches wide and deep and the hole in the burning tube 1 may be 4.8 inches long and 2.8 inches wide.

The burning tube 1 may be heated using any suitable heating source. In the embodiment illustrated in FIG. 1, the burning tube 1 is heated in a firebrick open-topped furnace chamber 4 optionally using a charcoal fire. The burning tube 1 is connected to a tar and ash collector 6, optionally by insertion into a fitted opening 5 in the tar and ash collector 6. The tar and ash collector 6 may be cylindrical in shape and filled with water to a suitable volume. For example, the tar and ash collector 6 may 36 inches high and may be filled to half its internal capacity with water. The harsh flavored smoke exits the burning tube 1 and enters the tar and ash collector 6, optionally through a hole in the bottom of the burning tube 1 inserted into the fitted opening 5 in the tar and ash collector 6. The tar and ash created by the burning sawdust pass through the hole and are collected in the water in the tar and ash collector 6. A tar and ash drain valve 7 is closed during smoke generation and collection. A device for removing the ash manually through, for example, a door and a water seal, may be incorporated into the device allowing for the manual removal of ash. It will be appreciated that the removal of ash may be carried out using any suitable means or device.

The smoke exits the tar and ash collector 6 in the direction indicated by the arrow 9 and is collected in a collection bag 10. In one embodiment, the collection bag 10 is a multi-use disposable plastic bag. An exit valve with a flexible hose 8 may be used to connect the tar and ash collector 6 with the collection bag 10. The collection bag 10 may be connected to the exit valve and flexible hose 8 once the charcoal fire is fully burning. The charcoal fire may be maintained to heat the burning tube 1 to 300° to 450° C., and thick smoke visibly exits the tar and ash collector 6, optionally via the exit valve flexible hose 8.

The burning tube 1 may be readily removed from the apparatus for cleaning or repair by lifting off the hopper 3 and pulling the tube in the opposite direction of the arrow 9. A cleaning rod 11 may be used to scrape ash or unburned sawdust remaining inside the burning tube 1 while spare burning tubes 1 may optionally be inserted into the apparatus.

The first smoke, which may be harsh or unfavorably flavored smoke, is collected in the collection bag 10 and may be stored in the collection bag 10 for at least one hour to allow steam in the smoke to condense into water and the tar and water to settle out of the smoke. Multiple bags of smoke may be collected and stored prior to proceeding with the next steps of the apparatus.

Figure 2:
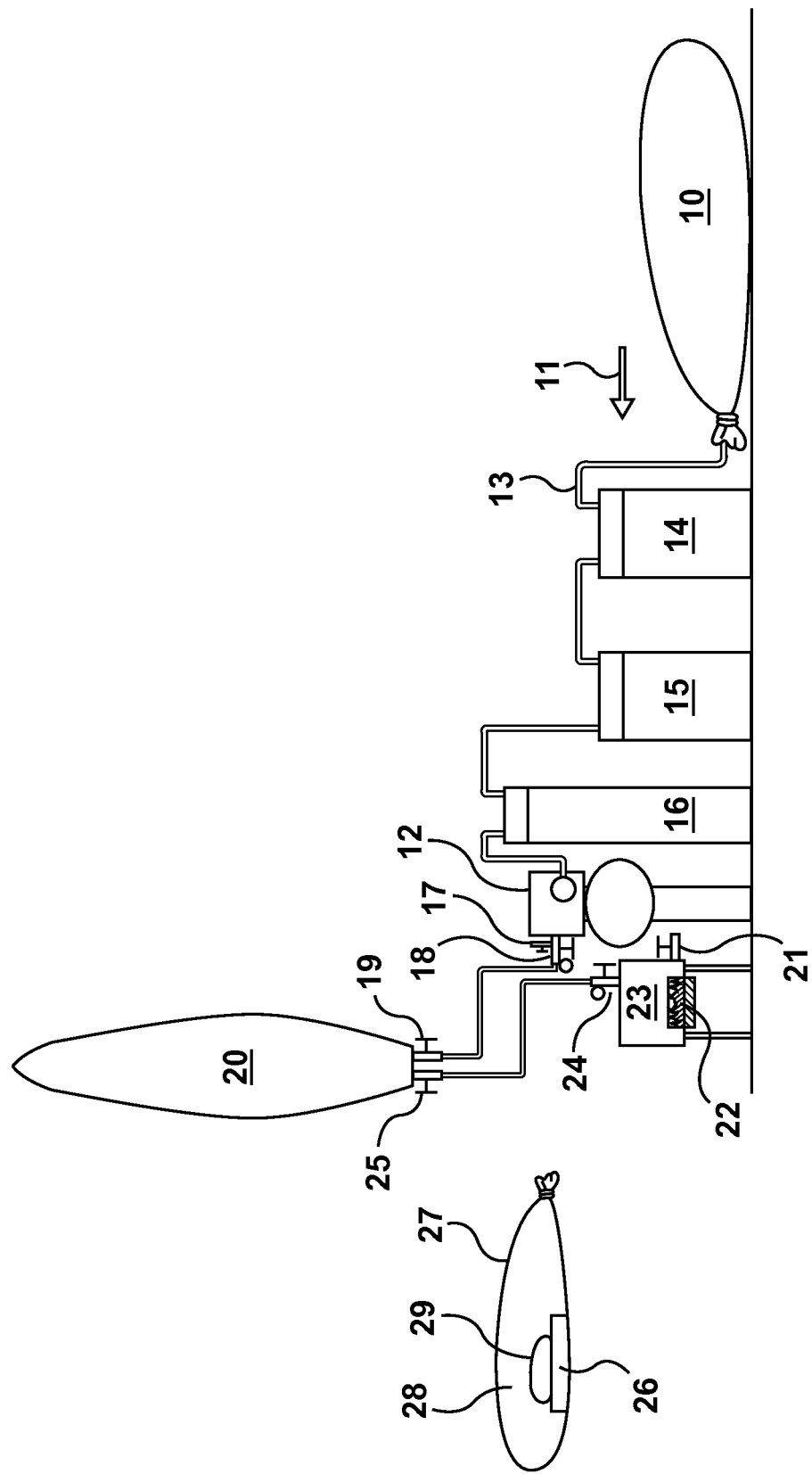
FIG. 2 is a schematic illustrative of one embodiment of an apparatus for filtering smoke from softwoods, such as pine or tropical palms such as coconut wood or mixed sawdust from a sawmill that are not traditionally used for smoking seafood or meat due to the harsh flavor imparted by their smoke, blending it with unfiltered pleasant flavored wood smoke and applying it to meat or seafood during a curing process, resulting in a fresh-appearing cold smoked product that may be further cold-smoked or consumed as is.

One non-limiting embodiment of a method and apparatus for filtering the harsh flavored-imparting smoke comprises blending the harsh flavored-imparting smoke with unfiltered pleasant flavor-imparting smoke and applying it to meat or seafood in curing and cold-smoking the meat or seafood is shown in FIG. 2.

The collection bag 10 filled with unfiltered first smoke, typically harsh flavored smoke, is connected to a filtering and blending apparatus, for example that shown in FIG. 2, and its contents are drawn through the apparatus by a compressor 12. The first smoke is drawn from the collection bag 10 through two cylindrical charcoal filters 14 and 15. A flexible hose 13 may be used to connect the filters with the collection bag 10. The charcoal filters may contain for example wood charcoal, screens and aquarium filter materiel. The smoke then passes through a final charcoal filter 16 comprising charcoal and optionally screens and aquarium filter material. The final charcoal filter 16 may be 5 inches in diameter and 40 inches high.

The charcoal filters 14 and 15 and the final charcoal filter 16 substantially remove the harsh and unfavorable flavor-imparting components of the softwood such as pine and coconut wood or other woods such as mixed wood sawdust from a sawmill that are not traditionally used for smoking seafood meat due to the harsh flavor imparted by their smoke from the first smoke that is drawn through the filters. This filtered first smoke will be referred to as the filtered smoke.

The filtered smoke is then moved to a smoke mixing bladder 20. This may be accomplished in any suitable manner. For example, an optional bypass valve 17 on the compressor 12 may be left open until sufficient smoke has passed through the filters 14, 15 and 16 to displace any smoke remaining therein. The bypass valve 17 may then be closed and an exit valve with low-pressure flow meter 18 and an inlet valve 19 on the smoke mixing bladder 20 is opened allowing the filtered smoke to begin entering the smoke mixing bladder 20.

Optionally, concurrently with or sequentially following the beginning of filtering the first smoke, an optional tar drain valve 21 may be opened and an electric burner plate 22 may filled with pleasant flavor-imparting chips or sawdust such as hardwood chips or sawdust that create a pleasant second smoke that is a flavor-imparting smoke, set at for example 300° to 450° C. and activated. The second smoke fills a smoke collection chamber 23, which is loosely fitted over the electric burner plate 22 to allow airflow, with the smoke. In one non-limiting embodiment, the smoke collection chamber 23 may measure 10 inches high by 10 inches wide and 10 inches long. The second smoke is then drawn into the smoke mixing bladder 20 for mixing with the filtered smoke. This may be carried out in any suitable manner, for example but not essentially, by closing tar drain valve 21 once thick smoke is visibly flowing from the tar drain valve 21, opening the smoke collection chamber exit valve equipped with a low-pressure flow meter 24 and opening the flavorful smoke inlet valve 25 on the smoke mixing bladder 20.

Optionally, the apparatus may include flow meters to monitor smoke flow rates. In this way, the flow rates may be altered to adjust the ratios of filtered smoke to flavored smoke in the smoke mixing bladder 20. This may be accomplished in any suitable manner. For example, the smoke flow rate through the exit valve with low-pressure flow meter 18 and the exit valve equipped with a low-pressure flow meter 24 may be adjusted to increase or decrease the relative percentages of unfiltered pleasant flavor-imparting smoke and harsh-flavor filtered smoke.

Optionally, the mixture may be 20% unfiltered second smoke, pleasant flavor-imparting smoke, and 80% filtered smoke. This mixture will impart a balance of preservative and pleasant flavor-imparting effects on the meat or seafood to be cured or cold smoked with the blended flavored smoke. It will be appreciated that any ratio may be used of unfiltered smoke to filtered smoke to generate a desired flavor. However, for economic savings, it is desired but not essential to use more filtered smoke than unfiltered smoke. For example, a range of from 1 to 49% unfiltered smoke to 99 to 51% filtered smoke may be used and any ratio there between.

One illustrative example of a curing and cold smoking process for meat or seafood using blended flavored smoke is as follows. The illustrative process begins by placing a 1½ inch high raised rack 26 inside a disposable plastic bag 27, placing a dry mixture of 60% salt and 40% sugar on all surfaces of the meat or seafood 29 to be cured and cold smoked and filling the disposable plastic bag 27 with blended flavored smoke at ambient room temperature and sealing it. The disposable plastic bag 27 with its contents is then placed in a refrigerated environment at for example from −1° to 3° C. for 12 to 18 hours, for example 17 hours. This temperature range meets the requirements of FAO and FDA for HACCP and the control of histamine development in scombroid fish species and pathogen development in fish and seafood. The amount and composition of the dry mixture of salt and sugar may be varied and any ratio used. Additionally, for thick pieces of fish or meat, a liquid mixture of salt, sugar and water in any suitable ratio may be injected into the fish or meat using commercially available brine injection equipment and the blended smoke injected into the fish or meat using commercially available gas injection equipment prior to the curing and smoking process in the disposable bag 27. When removed from the disposable bag 27, the smoked meat or fish will have a cured and smoked flavor and fresh appearance, similar to foods cured using salt and/or sugar and smoke extract and may be used as a finished product at this point or may go on to the second stage disclosed in the invention to make a fully, traditional appearing, cold smoked product.

Figure 3:
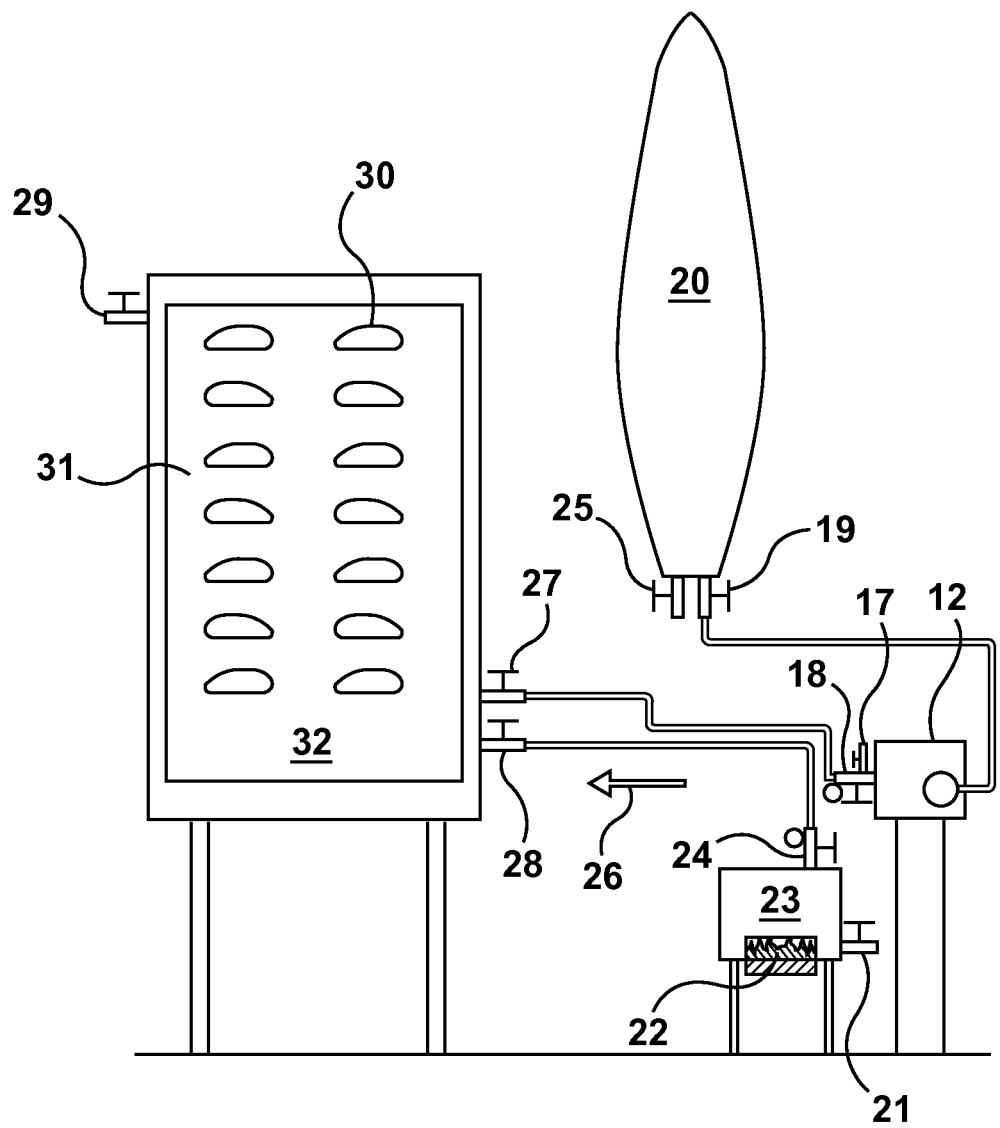
FIG. 3 is a schematic illustrative of one embodiment of an apparatus for applying and further blending the blended flavored smoke with unfiltered smoke in a refrigerated smoking chamber containing cured meat or seafood to complete a cold smoking process of the meat or seafood resulting in a cold smoked product.

An embodiment of an apparatus and method for applying a blended flavored smoke to the meat or seafood to be cured or cold smoked in the second and final stage of curing and cold smoking is shown in FIG. 3.

More specifically, with the compressor 12 not activated, the smoke-blending bladder 20 is connected to the compressor inlet and the smoke-blending bladder inlet valve 19 opened. The compressor exit valve with optional low-pressure flow meter 18 is connected to the blended flavored smoke inlet valve 27, which is closed.

The exit valve equipped with an optional low-pressure flow meter 24 on the smoke collection chamber 23 is connected to final inlet valve 28. Both of these valves remain closed. The tar drain valve 21 is opened and the electric burner plate 22 is filled with hardwood chips or sawdust or organic smoking material that creates pleasant flavor-imparting smoke, set at between about 300° to 450° C. and activated. In another embodiment, the smoke may be generated in a similar smoke generator as that outlined with respect to FIG. 1. This activation fills the smoke collection chamber 23, which is loosely fitted over the electric burner plate 22 to allow airflow, with smoke. Once thick smoke is visibly flowing from the tar drain valve 21 it is closed, the smoke chamber exit valve equipped with an optional low-pressure flow meter 24 is opened, the final inlet valve 28 is opened, the compressor exit valve with optional low pressure flow meter 18 is opened, the blended flavored smoke inlet valve 27 is opened, the final exit valve 29 is opened and the compressor 12 is activated.

The blend of smoke comes into contact with the curing meat or seafood 30 that has been placed on racks 31 inside the refrigerated cold smoking chamber 32 substantially maintained at 0° to 4.4° C. but with short periods up to about 35° C., with the time above 4.4° C. optionally not to exceed 2 hours cumulatively so as to meet the requirements of FAO and FDA for HACCP and the control of histamine development in scombroid fish species and pathogen development in meat and seafood.

A blend of unfiltered flavorful smoke and blended smoke is circulated through the refrigerated cold smoking chamber 32 and the length of time of such circulation may be varied depending on the preservative and flavor-imparting effects desired for the finished product. Circulation time may also be considered for time and temperature exposure limits so the time above 4.4° C. is optionally not to exceed 2 hours cumulatively so as to meet the requirements of FAO and FDA for HACCP and the control of histamine development in scombroid fish species and pathogen development in meat and seafood.

One optional blend is 60% unfiltered flavorful smoke to 40% blended smoke resulting in a flavorful blended flavored smoke circulating through the refrigerated cold smoking chamber 32. An optional circulation time for flavor, preservative qualities and HACCP considerations is 20 minutes of circulation followed by sealing the remaining blended flavored smoke inside the cold smoking chamber by closing the blended flavored smoke inlet valve 27, the final inlet valve 28 and the final exit valve 29 for one hour. The circulation and sealing steps may be repeated, for example repeated 3 times. It will be appreciated that any ratio of unfiltered flavorful smoke to blended smoke may be used and is within the scope of the invention.

Once the charcoal in the charcoal filters 14, 15 and 16 has become unusable as a filter element, the charcoal filters 14, 15 and 16 may be dried and used as fuel in the furnace chamber 4.

It will be appreciated that the smoke generators outlined herein may be the same in each embodiment to make the process of smoking more consistent in terms of how smoke is made.

It will be appreciated by persons skilled in the art that various modifications and/or variations may be made to the embodiments of the invention without departing from the scope or spirit of the invention. The embodiments disclosed herein are therefore intended to be illustrative only and are not intended to be limiting in any way. Each of the embodiments described herein may be combined together unless otherwise indicated.

What is claimed is:

1. A smoking apparatus for producing a blended gaseous smoke for smoking meat or seafood, the smoking apparatus comprising:
    a smoke generating apparatus arranged for burning a first organic material to generate a first unfiltered gaseous smoke, the first unfiltered gaseous smoke comprising a harsh flavor imparting characteristic;
    a collection container arranged for collecting the first unfiltered gaseous smoke from the smoke generating apparatus;
    an inlet configured to receive the first unfiltered gaseous smoke from the collection container;
    a filter in communication with the inlet, the filter arranged to receive the first unfiltered gaseous smoke from the collection container and retain the harsh flavor imparting characteristic from the first unfiltered gaseous smoke therein, thereby producing a filtered gaseous smoke with the harsh flavor imparting characteristic removed;
    a smoke collection chamber configured to receive a second organic smoking material, the smoke collection chamber in communication with a burner for smoking the second organic smoking material when placed in the smoke collection chamber to generate a second unfiltered gaseous smoke; and
    a smoke mixing bladder in communication with both the filter and the smoke collection chamber, the smoke mixing bladder configured to receive the filtered gaseous smoke and the second unfiltered gaseous smoke and blend the filtered gaseous smoke and the second unfiltered gaseous smoke, providing a blended gaseous smoke for curing and cold smoking a meat or seafood.

2. The smoking apparatus of claim 1 further comprising:
    i) a flow meter and a flow valve between the filter and the smoke mixing bladder for allowing variable control of the flow of filtered gaseous smoke into the smoke mixing bladder; and
    ii) a flow meter and a flow valve between the smoke collection chamber and the smoke mixing bladder for allowing variable control of the flow of the second unfiltered gaseous smoke into the smoke mixing bladder.

3. The smoking apparatus of claim 1 further comprising a cold smoking chamber in communication with the smoke mixing bladder for receiving blended gaseous smoke therefrom and the smoke collection chamber for receiving unfiltered gaseous smoke therefrom, the cold smoking chamber suitable for holding meat or seafood for cold smoking thereof.

4. The smoking apparatus of claim 3 further comprising:
    i) a flow meter and a flow valve between the smoke mixing bladder and the cold smoking chamber for allowing variable control of the flow of blended gaseous smoke into the cold smoking chamber; and
    ii) a flow meter and a flow valve between the smoke collection chamber and the cold smoking chamber for allowing variable control of the flow of unfiltered gaseous smoke into the cold smoking chamber.

5. The smoking apparatus of claim 1, wherein the burner is an electric burner plate and the smoke collection chamber is fitted over the burner plate.

6. The smoking apparatus of claim 1, wherein the filter comprises at least one charcoal filter configured to filter unfiltered gaseous smoke when passed therethrough by capturing harsh flavor imparting components.

7. The smoking apparatus of claim 1, further comprising a compressor situated downstream of the filter and upstream of the smoke mixing bladder, the compressor configured to draw the first unfiltered gaseous smoke through the filter and supply the filtered gaseous smoke to the smoke mixing bladder.

8. The smoking apparatus of claim 1, wherein the smoke mixing bladder (20) and smoke collection chamber (23) are in direct, immediate communication with one another along a conduit.

9. The smoking apparatus of claim 1, comprising
    the collection container (10) being directly coupled to said inlet and arranged to allow water and tar to settle out of said first unfiltered gaseous smoke and direct only said first unfiltered gaseous smoke to said inlet, and a series of charcoal filters (14, 15, 16) communicating with both said smoke mixing bladder (20) and said collection container (10) for filtering said first gaseous smoke.

10. The smoking apparatus of claim 9, additionally comprising a compressor (23) communicating with said smoke mixing bladder (20) and filters (14, 15, 16), and situated to draw the first gaseous unfiltered smoke out of said collection container (10).

11. The smoking apparatus of claim 9, wherein the smoke mixing bladder (20) is situated above said smoke collection chamber (23), said filters (14, 15, 16) and said collection container (10).

12. The smoking apparatus of claim 1, wherein:
 the filter (14, 15, 16) is situated along a line (13) in communication with the inlet (11),
 the smoke collection chamber (23) is separately configured and arranged to receive the second organic smoking material from a different source, and
 the smoke mixing bladder (20) separately communicates with the line (13) containing the filter (14, 15, 16) and a line leading directly from the smoke collection chamber (23) to the smoke mixing bladder (20).

\* \* \* \* \*